United States Patent [19]

Erickson et al.

[11] Patent Number: 4,747,735

[45] Date of Patent: May 31, 1988

[54] TOOLHOLDER AND METHOD OF RELEASABLY MOUNTING

[75] Inventors: Robert A. Erickson, Raleigh, N.C.; Rainer von Haas, Geesthact, Fed. Rep. of Germany; Norbert Reiter, Mettmann; Hans W. Tack, Velbert, both of Fed. Rep. of Germany; James W. Heaton, Raleigh, N.C.

[73] Assignees: Kennametal Inc., Latrobe, Pa.; Krupp Widia GmbH, Essen, Fed. Rep. of Germany

[21] Appl. No.: 7,070

[22] Filed: Jan. 27, 1987

[51] Int. Cl.[4] .......................... B23C 5/26; B23B 29/12
[52] U.S. Cl. .................... 409/234; 82/36 B; 279/75; 408/239 R
[58] Field of Search ........................ 409/232, 233, 234; 408/238, 239 R, 239 A; 279/1.13, 1.0 A, 108, 2 R, 41 R, 102, 96, 103, 75; 82/36 A, 36 B, 36 R; 403/322, 374

[56] References Cited

U.S. PATENT DOCUMENTS

| 1,119,528 | 12/1914 | Nieman . | |
| 2,970,844 | 2/1961 | Better | 279/75 |
| 2,990,188 | 6/1961 | Better et al. | 279/75 |
| 3,115,798 | 12/1963 | Donaway | 82/34 |
| 3,498,653 | 3/1970 | McCreery et al. | 287/119 |
| 3,658,352 | 4/1972 | Koch et al. | 279/1 B |
| 3,851,562 | 12/1974 | Tomita et al. | 20/11 A |
| 3,989,260 | 11/1976 | Zonkov et al. | 279/1 ME |
| 4,018,112 | 4/1977 | Heaton et al. | 82/1 C |
| 4,068,559 | 1/1978 | Schmid et al. | 90/11 D |
| 4,122,755 | 10/1978 | Johnson et al. | 90/11 A |
| 4,131,054 | 12/1978 | Johnson et al. | 90/11 |
| 4,135,418 | 1/1979 | McCray et al. | 82/36 A |
| 4,197,771 | 4/1980 | Heaton et al. | 82/36 B |
| 4,228,705 | 10/1980 | Heisner | 82/36 |
| 4,262,917 | 4/1981 | Ottestad | 279/1 ME |
| 4,270,422 | 6/1981 | Andersson | 82/36 R |
| 4,292,866 | 10/1981 | Kaczynski | 82/36 R |
| 4,350,463 | 9/1982 | Friedline | 409/234 |
| 4,406,195 | 9/1983 | Kruger et al. | 82/36 |
| 4,573,824 | 3/1986 | Ehle | 403/322 |
| 4,575,293 | 3/1986 | Berti | 409/234 |
| 4,604,012 | 8/1986 | Kawasaki et al. | 409/233 |
| 4,680,999 | 7/1987 | Kojima et al. | 82/36 B |

FOREIGN PATENT DOCUMENTS

| 0026751 | 8/1981 | European Pat. Off. | 279/79 |
| 0061075 | 9/1982 | European Pat. Off. | 409/233 |
| 0123156 | 10/1984 | European Pat. Off. . | |
| 233321 | 2/1986 | German Democratic Rep. | 409/234 |
| 1333872 | 10/1973 | United Kingdom . | |
| 1456611 | 11/1976 | United Kingdom . | |
| 2154479 | 9/1985 | United Kingdom . | |

Primary Examiner—William R. Briggs
Attorney, Agent, or Firm—John J. Prizzi

[57] ABSTRACT

The present invention relates to an improved toolholder for releasably mounting on a tool support member. The toolholder is provided with a forward end for receiving a tool and a shank extending from the forward end for being releasably received in a bore of a tool support member. The shank has a first section for interference fitting with the bore of the tool support member when a rearwardly facing face on the toolholder is in abutment with a forwardly facing surface on the tool support member. The shank has a second section, rearwardly of its first section, for expansible abutment with the bore of the tool support member.

14 Claims, 3 Drawing Sheets

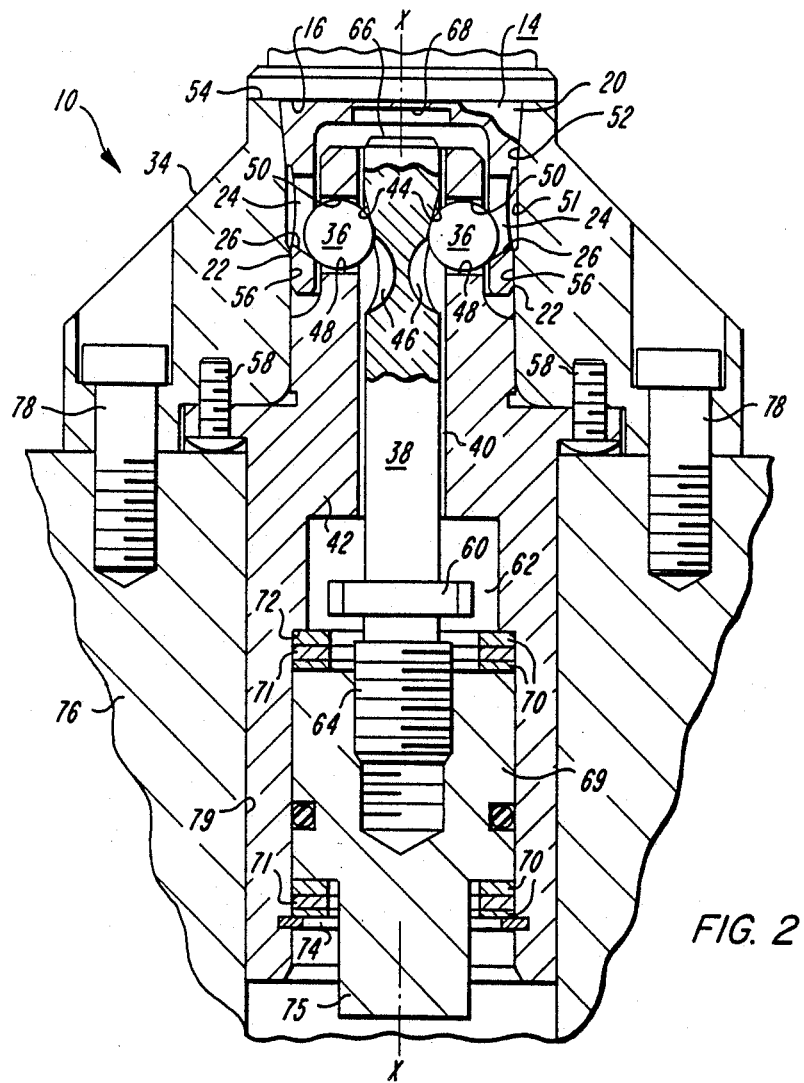
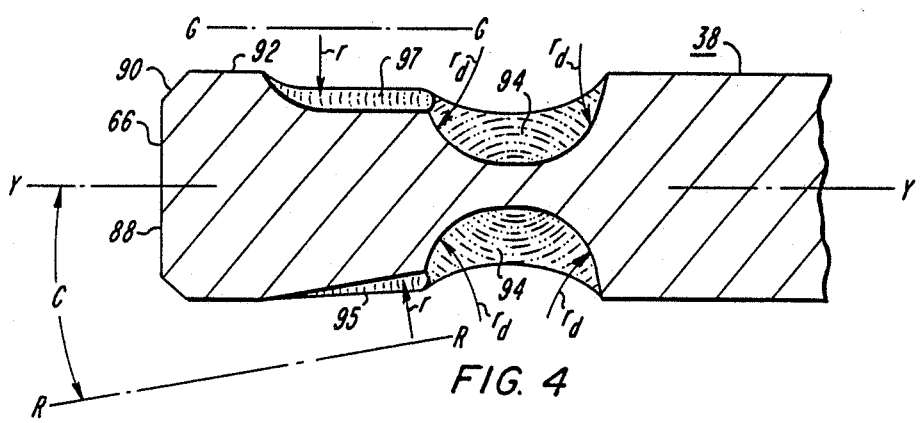

TOOLHOLDER AND METHOD OF RELEASABLY MOUNTING

BACKGROUND OF THE INVENTION

The present invention relates to articles for releasably holding tools and the methods of using these articles. It is especially concerned with toolholders and support members wherein the support member has a bore for receiving the shank of the toolholder and the toolholder has a cutting insert seat on its forward end. Such articles are used in the cutting and shaping of workpieces where it is important that the toolholder be held by the tool support member in a rigid manner so that both movement and vibration are minimized during the metalcutting operation.

Many devices in the prior art have proven to be successful in this regard and are exemplified by McCreery U.S. Pat. No. 3,498,653; McCray et al U.S. Pat. No. 4,135,418; Heaton et al U.S. Pat. No. 4,197,771; and Friedline U.S. Pat. No. 4,350,463. The foregoing devices are concerned with the use of ball-like locking elements to hold the shank of a toolholder in the bore of the tool support member.

However, there is always a need for improved toolholders, support members and locking members that provide a greater degree of rigidity during metalcutting operations such that a single assembly of toolholder, support member and locking members can be used in the widest possible variety of machining operations to provide a given surface finish in a heavier cut or a finer surface finish for a given depth of cut and feed rate.

SUMMARY OF THE INVENTION

A new toolholder design has been found to surprisingly provide a significant improvement over prior toolholder designs in terms of rigidity of mounting and accuracy of location on a tool support member, and in ease and cost of manufacture.

The present toolholder design utilizes abutment at three locations with a tool support member as follows:

(1) abutment between a rearwardly facing face on the toolholder and a forwardly facing surface of a tool support member for axial support and location;

(2) an interference fit between a tapered first section of the toolholder shank and a tapered section of the bore of the support member for radial location, and radial support; and (3) expansible abutment between a second section of the shank and the bore of the tool support member to provide additional radial support for improved static and dynamic stiffness.

In accordance with the present invention, a new toolholder is provided for mounting on a tool support member having a bore extending rearwardly therein and a forwardly facing surface thereon. The toolholder has a forward end for receiving a tool and a shank receivable in the bore of the tool support member extending rearwardly from the forward end. In addition, a rearwardly facing face is provided on the toolholder, preferably at the junction of its forward end and shank, for abutment with the forward facing surface of the tool support member. The shank has a first section which is dimensioned to provide a resilient interference fit with the tool support member bore when rearwardly facing face of the toolholder is in abutment with the forwardly facing surface of the tool support member. The shank is further provided with a second section, rearwardly of its first section, which is resiliently expansible for abutment with the bore of the tool support member.

Preferably, the first section of the shank is a radially outward facing first surface of revolution that tapers radially inwardly as it extends rearwardly. Most preferably, it is a conical surface.

Preferably, the second section of the shank is a radially outward facing second surface of revolution of constant diameter (i.e., cylindrical) or of varying diameter (i.e., conical).

BRIEF DESCRIPTION OF THE DRAWINGS

The foregoing and other aspects of the present invention will become more apparent upon review of the following detailed description of the invention in conjunction with the drawings which are briefly described below:

FIG. 2 shows a partial side plan view of an embodiment of a toolholder assembly in accordance with the present invention in partial cross section.

FIG. 4 shows an enlarged diametric longitudinal cross section of an alternative embodiment to the forward end of the locking rod shown in FIG. 2.

DETAILED DESCRIPTION OF THE INVENTION

Figure 1:
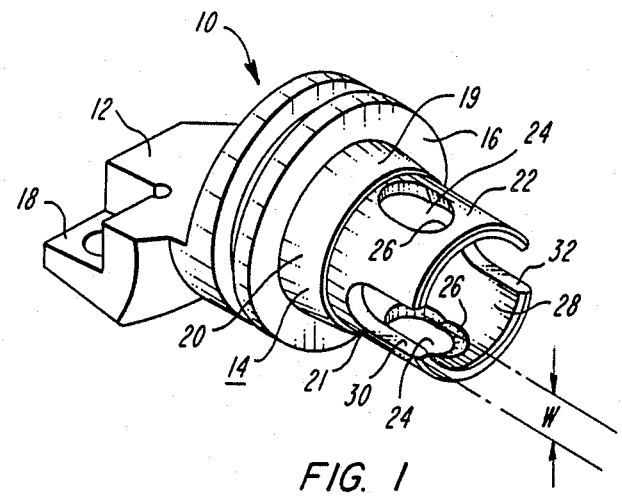
FIG. 1 shows a perspective view of an embodiment of a toolholder in accordance with the present invention.

Shown in FIG. 1 is a preferred embodiment of a toolholder 10 in accordance with the present invention. The toolholder 10 has a forward end 12, a shank 14 joining the forward end 12 and a rearwardly facing abutment face 16 at the juncture of the forward end 12 and the shank 14.

The forward end 12 is conventional in nature and has a conventional tool receiving pocket 18 thereon for receiving a conventional shim, indexable cutting insert and locking pin (not shown). It should be understood, however, that the present invention is not limited to the forward end design shown in FIG. 1, but includes by way of example and not limitation forward ends having multiple insert seats such as may be found on a milling cutter. In addition, the forward end may be a non-cutting tool (e.g., a die, ram, inspection device, fixture component, etc.).

The rearwardly facing abutment face 16 is designed for abutment with the forwardly facing surface of a tool support member on which the toolholder 10 is to be mounted. Rearwardly facing abutment face 16 is preferably planar in nature and preferably defines a plane that is perpendicular to the longitudinal axis of symmetry of the shank 14.

As shown in FIG. 1, the shank 14 is preferably an integral part of the toolholder 10, and is preferably machined from a single piece of steel. However, it is also contemplated that the shank 14 and the forward end 12 of the toolholder may be independent pieces that may be subsequently mechanically joined together with the rearwardly facing abutment face 16 being a part of either the forward end 12 or the shank 14. In this manner, a single shank may be utilized with a variety of different toolholder forward ends or other tool components. For example, the shank design of the present invention may also be used in segments, extensions or assembly components of a modular boring system. In fact, it is envisioned that the present shank design may be used in a plurality of segments to join one segment to the next.

The shank 14 is at least partially and preferably totally tubular in nature. The outer surfaces of the shank 14 may be divided into two sections. The first section 19 has a first surface of revolution 20 about the longitudinal axis of symmetry which faces radially outwardly and tapers inwardly while extending rearwardly. As shown in this figure, preferably this first surface of revolution is conical in nature.

Rearwardly of and joined to the first section of the shank 14 is a second section 21 which is tubular in nature. The second section has an outer surface which is a second surface of revolution 22 located rearwardly and inwardly of the first surface of revolution 20. The second surface of revolution 22 is preferably coaxial with the first surface of revolution 20 and is preferably cylindrical in nature.

The tubular wall of the second section 21 of the shank is perforated by a first and a second perforation 24 which are circumferentially spaced from each other, preferably at 180 degrees to each other. The first and second perforations 24 respectively contain a first and a second forwardly facing concave abutment surface 26 which extend forwardly while extending radially away from the inner surface 28 of the shank. On large diameter shanks, there may be three or four circumferentially spaced perforations 24.

Preferably, circumferentially spaced between perforations 24 are slots 30 and 32 on the end of the tubular shank 14 and which interrupt the second surface of revolution 22. These slots 30 and 32 are designed to serve as keyways to accept keys in the tool support member bore. In addition, by locating the slots at the rear end of the tubular shank, the flexibility of the portion of the shank behind the perforations can be readily controlled by changes in the location, size and number of slots. In the preferred embodiment shown in FIG. 1, only slot 30 located in line with the cutting tool receiving pocket 18 is utilized as a keyway to hold the toolholder nonrotatably insofar as the width, w, of slot 30 is dimensioned to provide a slip fit with a key whereas the width of slot 32 is slightly larger (e.g., 0.010 inches greater) than the width of slot 30. This provides the added benefit that the tubular shank can be readily received in a tool support bore provided with two keys in order to accept both right handed and left handed toolholders (i.e., cutting tool pocket on the left or right hand side of the toolholder).

Now referring to FIG. 2., the toolholder 10 is resiliently mounted (i.e., locked up) on a tool support member 34 via locking elements 36. These locking elements 36 preferably are two spherical balls (i.e., spheres) which are held partially within the perforations 24 by a locking rod 38 nonrotatably contained within a longitudinal cylindrical passageway 40 in stub 42. The combination of locking elements 36, locking rod 38 and stub 42 form the locking mechanism. As shown in the figure, the diameter of the locking rod 38 is less than the diameter of the longitudinal passageway 40 to allow the locking rod 38 to be selfcentering during lock up. The forward end of locking rod 38 has two conventional concave cylindrical abutment ramps 44 which drive the spheres 36 outwardly through radial cylindrical apertures 48 in stub 42 when the locking rod 38 is pulled and held rearwardly as shown in FIG. 2. When the lock rod 38 is pushed forwardly to release the toolholder, spheres 36 are receivable in conventional concave depressions 46 to allow the toolholder to be removed.

During locking, as the locking balls are moved outwardly by ramps 44, they are driven into abutment with the forwardly facing concave abutment surfaces 26 in perforations 24 and rearwardly facing concave surfaces 50 in the radial apertures 48 of the stub 42. In this manner, a force having both a rearward and a radially outward components is directed against the shank 14 of the toolholder 10 which has been inserted into the bore 51 of the tool support member 34. The rearward component of this force causes the first surface of revolution 20 into an interference fit with the bore's forward surface of revolution 52 about longitudinal axis X—X. The forward surface of revolution 52 faces radially inwardly and tapers radially inwardly while extending rearwardly and as shown in the figure is preferably conical and tapers inwardly at the same angle as found on the first surface of revolution 20 of the shank.

As the shank's first surface of revolution 20 and the bore's forward surface of revolution 52 are being resiliently interference fit together, the rearwardly facing face 16 of the toolholder is being forced into abutment with the forwardly facing surface 54 of the tool support member 34.

The radially outward component of the force directed against shank 14 resiliently expands at least a portion of the second surface of revolution 22, preferably located in areas rearwardly of the first and second forwardly facing concave abutment surfaces 26, into abutment with the bore's radially inwardly facing rear surface of revolution 56 about the longitudinal axis X—X. This bore surface 56 is preferably concave cylindrical to assure more complete abutment with the convex cylindrical surface 22 of the shank. Preferably, the diameter of the bore surface 56 is about 0.002 to 0.004 inches greater than the outer diameter of the second surface of revolution 22 in its unexpanded state. This loose fit allows the present invention to be more easily utilized in robotic applications since the toolholder shank may be more easily inserted into the support member bore.

As shown in FIG. 2, the stub 42 is engaged in the bore of the tool support member 34 and held stationary by four bolts 58 (only two of which are shown) connecting it to the tool support member 34. The lock rod 38 and the locking elements 36 are loosely engaged in the stub longitudinal passageway 40 and radial apertures 48 respectively so as to be self-centering during locking. In the absence of a toolholder shank, the locking elements are loosely retained in their respective apertures by the lock rod 38 and the bore 51. The outside diameter of the stub 42 at its radial apertures 48 has been selected such that the difference between it and the diameter of the support member bore is small enough to assure that any locking element sticking out of a radial aperture 48 will be pushed into the aperture by the rearmost end of shank 14 as it is inserted into the bore and over the stub.

The lock rod 38 is held nonrotatably in longitudinal passageway 40 by the engagement of a key in a keyway, here shown as an oblong lug 60 on the lock rod in oblong recess 62 in the stub 42. At the rearward end of lock rod 38 is a threaded member 64 for engagement with conventional means for reciprocally moving and holding the locking rod 38 rearwardly for locking a shank 14 onto the tool support member 34, and forwardly for unlocking the shank 14 and then pushing shank 14 forwardly off the tool support member 34 via the abutment of forward abutment surface 66 on the lock rod and the shank push off surface 68 inside of the tubular portion of the shank 14.

The example of a conventional means for reciprocally moving shown in FIG. 2 is a torque nut unit consisting of a torque nut 69 threadedly engaged to threaded member 64 of the lock rod 38 and rotatively held within the rear end of the stub 42 between sets of thrust washers 70 having a thrust needle roller bearing 71 between them. The entire torque nut unit is retained axially stationary between a rearwardly facing annular shoulder 72 and a retaining ring 74. The rearmost end 75 of the torque nut 69 may then be engaged with a conventional power driven rotatable member (not shown) to rotate the torque nut and thereby move lock rod 38 forward or rearward. Alternatively, conventional springs may be used in place of the torque nut unit for reciprocal movement of the lock rod.

As shown in FIG. 2., the tool support member may be held on a larger conventional machine or base member 76 which may be, for example, a turret, spindle or boring bar, etc., by fastening means such as four bolts 78 (only two of which are shown). Machine member 76 has a cylindrical bore 79 for receiving the rear end of stub 42.

While not shown, tool support member 34 preferably further contains two cylindrical keys extending into its bore at 180 degrees to each other and at 90 degrees to perforations 24. These keys are conventional in design and engage the keyway slots 30 and 32 in the end of shank 14.

Figure 3:
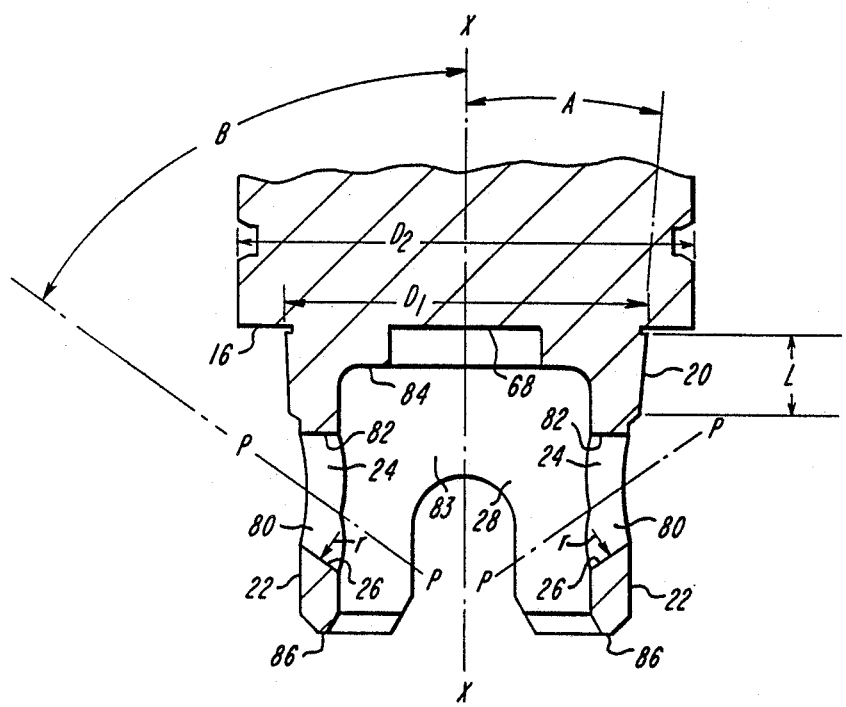
FIG. 3 shows a longitudinal cross section along a diameter of the toolholder shank shown in FIG. 1.

In FIG. 3, which is a cross section taken through the tubular shank 14 along a plane containing a shank diameter and the center lines P—P of abutment surfaces 26, it is clearly shown that abutment surfaces 26 preferably form walls 80 that are concave cylindrical in shape and have a radius of curvature r. These walls 80 are angled with respect to the longitudinal center line X—X of the shank at an angle B such that the rotational axis of symmetry P—P, and more importantly, forwardly facing concave abutment surfaces 26 on walls 80 extend forwardly while extending away from the inner surface 28 toward the outer surface 22 of the tubular shank 14. While it would be preferred that angle B is as large as possible to maximize mechanical advantage, at large angles, machining tolerances may interfere with the proper locating of the locking elements 36 against surfaces 26. It is, therefore, preferred that angle B is 50 to 60 degrees, and more preferably 55 degrees.

Concave forwardly facing abutment surfaces 26 have a radius of curvature r, the value of which is determined by the radius of curvature, $r_s$, of the convex abutment surface of the locking elements 36 which will abut against surfaces 26. It is preferred that r and $r_s$ be as close as possible to each other so that, when the locking elements 36 are abutted against surfaces 26, contact occurs over as large an area as possible in order to minimize deformation to the surface 26 and to the locking element surface, thereby prolonging their useful lifetimes. Preferably, in order to achieve this result, it is preferred that r is equal to, but no greater than, 0.004 inches, and more preferably 0.002 inches, larger than $r_s$.

It is important that the abutment surfaces 26 have the radius and slope described. It is also important that abutment surfaces 26 be at the same height in a direction parallel to the X—X axis to assure lockup occurs in both abutment surfaces. However, the other portions of the perforation walls that are not used for abutment with the locking elements may deviate from the above described relationships without affecting the performance of the present invention. For example, as shown if FIG. 3, the upper portion 82 of perforation walls extends radially outwardly from inner surface 28 to outer surface 22 so as to avoid the intersection of the perforations 24 with the first surface of revolution 20. If perforation 24 were to intersect the first surface of revolution 20, the corner formed thereby may damage the support member bore which is interference fit against it unless a clearance is provided in the support member bore at that location.

The first surface of revolution 20 is preferably conical as shown. The angle, A, that surface 20 makes with the longitudinal center line X—X of the shank is preferably between 1 and 5 degrees (and 2A is preferably between 2 and 10 degrees) to provide a self-sticking taper when engaged with the similarly tapered bore of the tool support member. More preferably, 2A is a Morse taper (i.e., 5 degrees, 43 minutes and 30 seconds).

The first surface of revolution 20 has been dimensioned to provide an interference fit with the forward tapered section in the bore of the tool support member. We have found that in hardened and tempered steels (e.g., AISI 4340 or its equivalent hardened to Rockwell C 40-45 for the toolholder shank and Rockwell C 50-55 for the support member bore) that in an unstressed state (i.e., not mounted in the tool support member) that the first surface of revolution should radially extend beyond the forward surface of revolution by at least 0.0005 inches (on a diameter) in order to obtain the benefits of the present invention. Preferably, for the aforementioned materials, the unstressed extension of the first surface of revolution should be no greater than 0.0015 inches to assure avoidance of plastic deformation, and/or fatigue damage, to the toolholder or the tool support member. In addition, a maximum 0.0015 inches has been selected to assure that the shank can be readily removed from the tool support member bore. It should, however, be readily apparent to those of ordinary skill that these values have been selected for the size of toolholder ($D_1=30$ mm, $D_2=40$ mm, L=6 mm and 2A=morse taper) and the materials described above to provide a desired range of contact stresses. In differing sizes or styles of toolholder, or toolholders and/or support members made of different materials, values outside of the range 0.0005 to 0.0015 inches may be appropriate to achieve equivalent results in terms of rigidity.

In addition to providing improved rigidity to the toolholder and support member assembly, the use of the interface fit as described herein also allows the tolerances on the diameter of the toolholder shank to be rather loose (e.g., ±0.0005 inch on a diameter) while still being assured of accurate centering and radial location and accurate longitudinal location through abutment between the rearwardly facing abutment face 16 on the toolholder and the forwardly facing surface 54 of the tool support member. Due to these loose tolerances, fabrication costs are also reduced.

As shown in FIG. 3., the second surface of revolution 22 is preferably a cylindrical surface, especially in those areas located rearwardly of forwardly facing concave abutment walls 26 insofar as we have found that cylindrical surfaces 22 can be expanded during lock up to provide larger areas of abutment with the cylindrical rear surface of revolution 56 in the tool support member 34 bore, as compared to complementary conical surfaces. As much surface contact as possible is preferred in that it provides enhanced rigidity to the toolholder.

An internal cavity 83 is formed in shank 14 by inner generally cylindrical surface 28 which is joined by rearwardly facing surfaces 84 and 68 at the forward end of the tubular shank. The cavity 83 has been sized to loosely accept the lock up mechanism shown in FIG. 2. At their rearmost ends, surfaces 28 and 22 are joined by tapering members 86. The tapering members 86 serve to ease loading of the shank 14 over stub 42 and into the bore of the tool support member 34, while also helping to push locking elements 36 into the stub during loading.

Shown in FIG. 4 is an enlarged diametric cross sectional view of an alternate embodiment of the forward member of the lock rod 38 shown in FIG. 2. The forward end 88 of the lock rod has a flat abutment surface 66 joined at its periphery by an annular chamfer 90. The forward end 88 is joined at the outermost edge of chamfer 90 by a cylindrical side surface 92 which extends rearwardly away from forward end 88 about its central axis of rotational symmetry Y—Y which intersects abutment surface 66 at 90 degrees. Side surface 92 is intersected by a first and a second depression 94 which are circumferentially spaced from each other, and preferably, as shown in the figure are at 180 degrees to each other and equidistant from the plane of abutment surface 66. These depressions 94 have been dimensioned to receive locking elements 36 in the unlocked position. The depressions 94 as shown are elongated in the direction of the longitudinal axis Y—Y and preferably have a concave spherical surface at each longitudinal end with a radius $r_d$ that is equal to or slightly larger than the radius of the locking element 36. The radial depth of depressions 94 into cylindrical side surface 92 is set so that the sum of the thickness of lock rod material separating depressions 94 plus the two diameters of the locking elements 36 is less than the internal diameter of the shank.

Joining the first depression 94 at its longitudinal end closest to abutment surface 66 is a ramp 95. Ramp 95 extends away from the first depression toward abutment surface 66 while receding radially outwardly from central axis Y—Y. The surface of ramp 95 is a concave cylindrical surface of revolution having a radius r about axis R—R which is inclined to axis Y—Y at angle C. Radius r is preferably equal to or slightly larger than the radius of the locking elements 36 and is preferably no greater than 0.004 inches, and more preferably 0.002 inches, larger than the radius of the locking elements 36.

While angle C should ideally be as small as possible to maximize mechanical advantage, this ideal configuration must be balanced against the ability to manufacture within a given tolerance and the concern that the shallower C is the longer the stroke required to achieve lock up and the longer the lock rod must be. I have found that setting angle C equal to 20 degrees to be a preferred compromise between these competing concerns, with angle C being equal to 15 degrees being more preferred.

Now joining the second depression 94 is a groove 97 rather than a ramp identical to ramp 95 as is found in prior art lock rod designs. Groove 97 joins the second depression at its longitudinal end closest to abutment surface 66 and extends away from the second depression toward abutment surface 66 parallel to central axis Y—Y. The surface of groove 97 is a concave cylindrical surface of revolution also having a radius r, but about axis G—G which is parallel to axis Y—Y.

By pulling the lock rod rearwardly, locking elements roll out of depressions 94 and onto groove 97 and ramp 95 which drive the locking elements radially outwardly to lock the toolholder onto the support member. When subsequently the lock rod is moved forwardly, the locking elements 36 roll into depressions 94 allowing the second surface of revolution 22 to collapse out of abutment with the bore's rear surface of revolution 56, thus unlocking the tool. Where the first surface of revolution 20 is a self-sticking taper, the lock rod may be advanced further forward so that the lock rod abutment surface 66 abuts against push off surface 68 within the tubular shank to release the toolholder from the tool support member.

The lock rod design utilizing a groove and a ramp is a significant departure from prior art designs utilizing two oppositely facing ramps inclined at equal angles and provides significant advantages thereover. For a given included angle (here the angle between axis R—R and axis G—G) the present design provides an increased mechanical advantage with a shorter lock up stroke required compared to a two ramp design having the same included angle formed between the two ramps.

Figure 5:
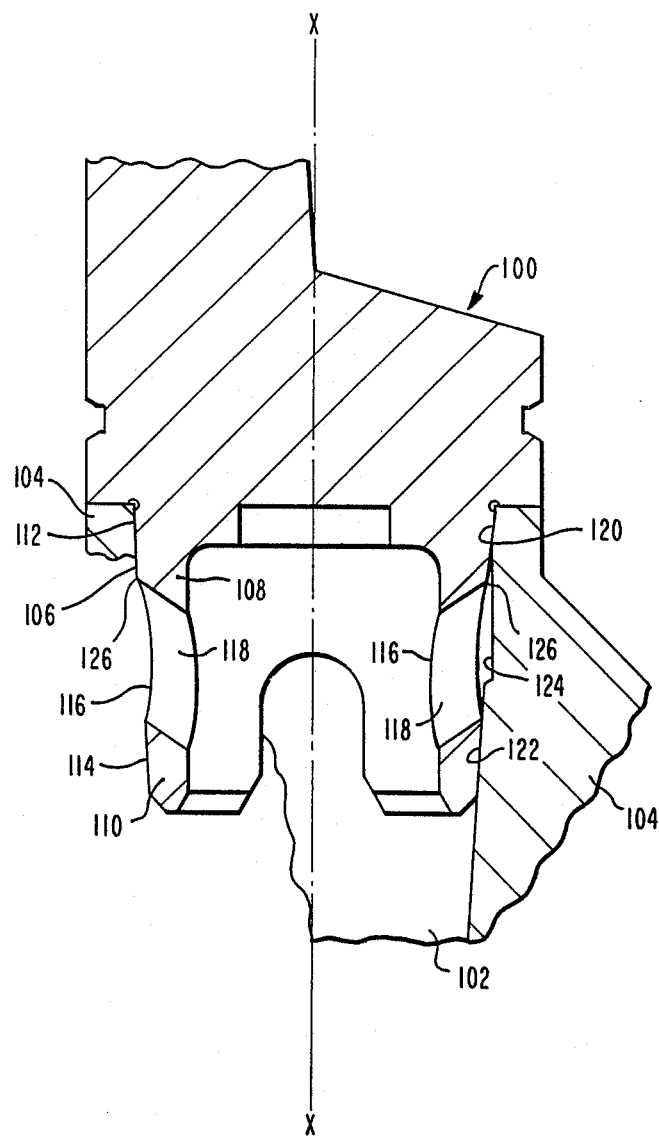
FIG. 5 shows a fragmented cross sectional view of an alternative embodiment of a toolholder and a support member in accordance with the present invention.

In an alternative embodiment in accordance with the present invention, a toolholder 100 is shown in FIG. 5 mounted in the bore 102 of a tool support member 104. The stub member locking rod, locking elements and keys have been removed for clarity, but may be functionally and structurally identical to those described in FIGS. 2 and 4. The embodiment of the toolholder 100 and tool support member 104 operates and functions in the same manner as the prior embodiments. The toolholder 100 structurally differs from the prior embodiment in that its shank 106 has a first section 108 and a second section 110 whose outer radial surfaces 112 and 114 are both conical, and are preferably part of the same conical surface of revolution, as shown. In addition, the perforations 116 for receiving the locking elements have totally cylindrical walls 118.

The bore 102 of the tool support member 104 has conical surfaces 120 and 122 which are complementary to the conical surface(s) of the shank 106. The first conical surface 120 is in an interference fit with the first section of the shank, while the second section of the shank has been expanded into abutment with the rear conical surface 122 of the bore. The rear and forward conical surfaces of the bore are separated from each other by a circumferential recess 124 in the bore which is located to control the length of the tapered surface 120 over which the interference fit occurs and to assure that the forward edge 126 of perforations 116 does not contact the bore during interference fitting, thereby avoiding damage to the bore or tool shank.

While all components utilized herein are preferably made from hardened and tempered steels, it will be clear to those of ordinary skill in the art that other materials may be substituted without detracting from the performance of the present invention. For example, while the locking elements 36 are preferably made of a chromium alloy steel having a Rockwell C hardness of 60-65, it is also contemplated that they may be made of cemented carbide. The stub 42 may be made of AISI 4340 steel or its equivalent having a Rockwell C hardness of 40-45. While the lock rod 38 may preferably be made of an alloy steel such as AISI 4340, it is more preferably made of a shock resisting tool steel, such as AISI S7 having a Rockwell C hardness of about 56-58.

Additional embodiments of locking rods, locking mechanisms and support members for use with the toolholders described herein are found in R. A. Erickson copending applications, Ser. Nos. 007,309, 007,310 filed on the same date as the present application. These applications, as well as all previously referred to patents, are hereby incorporated by reference in their entireties.

Changes and modifications in the specifically described embodiments can be carried out without departing from the scope of the invention which is intended to be limited only by the scope of the appended claims.

What is claimed is:

1. A toolholder for mounting on a tool support member having a bore extending rearwardly therein and a forwardly facing surface thereon, said toolholder comprising:
    a forward end for receiving a tool;
    a shank receivable in said bore and extending rearwardly from said forward end;
    a rearwardly facing face on said toolholder for abutment with said forwardly facing surface;
    said shank having a first section dimensioned to provide a resilient interference fit of at least 0.0005 inches with said bore when said rearwardly facing face is in abutment with said forwardly facing surface;
    said shank having a second section resiliently expansible for abutment with said bore rearwardly of said first section.

2. The toolholder according to claim 1 wherein said first section is a radially outward facing first surface of revolution tapering radially inwardly while extending rearwardly.

3. The toolholder according to claim 2 wherein said second section is a radially outward facing second surface of revolution.

4. The toolholder according to claim 3 wherein said second surface of revolution is a cylindrical surface.

5. The toolholder according to claim 3 wherein said second surface of revolution is coaxial with said first surface of revolution.

6. The toolholder according to claim 4 wherein said cylindrical surface is coaxial with said first surface of revolution.

7. The toolholder according to claim 2 wherein said first surface of revolution is conical and tapers radially inwardly at an angle in the range of 2 to 10 degrees.

8. The toolholder according to claim 6 wherein said first surface of revolution is conical and tapers radially inwardly at an angle in the range of 2 to 10 degrees.

9. The toolholder according to claim 3 wherein both said first surface of revolution and said second surface of revolution are conical and taper radially inwardly as they extend rearwardly.

10. A toolholder for mounting in a tool support member having a bore extending rearwardly therein and having a forwardly facing surface thereon, said toolholder comprising:
    a forward end for receiving a tool;
    a shank receivable in said bore and extending rearwardly from said forward end about a longitudinal axis;
    a rearwardly facing face on said toolholder for abutment with said forwardly facing surface;
    said shank having a first surface of revolution about said longitudinal axis facing radially outwardly and tapering inwardly while extending rearwardly for resilient interference fitting with said bore;
    said shank having a tubular portion symmetric with said longitudinal axis;
    the wall of said tubular shank portion perforated by a first and a second perforation at two circumferentially spaced locations rearwardly of said first surface of revolution;
    a first forwardly facing concave abutment surface in said first perforation;
    a second forwardly facing concave abutment surface in said second perforation;
    said first and second forwardly facing concave abutment surfaces extending forwardly while extending radially away from the inner surface of said tubular shank portion;
    said tubular shank portion having a second surface of revolution about said longitudinal axis, facing radially outwardly, cylindrical in nature, rearwardly of said first surface of revolution, for resiliently expansible abutment with said bore.

11. A toolholder for mounting in a tool support member having a bore extending rearwardly therein and having a forwardly facing surface thereon, said toolholder comprising:
    a forward end for receiving a tool;
    a shank receivable in said bore and extending rearwardly from said forward end about a longitudinal axis;
    a rearwardly facing face on said toolholder for abutment with said forwardly facing surface;
    said shank having a first surface of revolution about said longitudinal axis facing radially outwardly and tapering inwardly while extending rearwardly for resilient interference fitting with said bore;
    said shank having a tubular portion symmetric with said longitudinal axis;
    the wall of said tubular shank portion perforated by a first and a second perforation at two circumferentially spaced locations rearwardly of said first surface of revolution;
    a first forwardly facing concave abutment surface in said first perforation;
    a second forwardly facing concave abutment surface in said second perforation;
    said first and second forwardly facing concave abutment surfaces extending forwardly while extending radially away from the inner surface of said tubular shank portion;
    said tubular shank portion having a second surface of revolution about said longitudinal axis, facing radially outwardly, conical in nature, rearwardly of said first surface of revolution, for resiliently expansible abutment with said bore.

12. A method of releasably mounting a toolholder onto a tool support member having a bore extending rearwardly therein and a forwardly facing surface thereon, said toolholder having a forward end, a shank extending rearwardly therefrom, and a rearwardly facing face, said shank having a first and a second radially outward facing surface of revolution, said second surface of revolution located rearwardly of said first surface of revolution, said method comprising the steps of:
    inserting said shank into said bore;
    resiliently interference fitting said first surface of revolution into said bore;

abutting said rearwardly facing face against said forwardly facing surface;

and resiliently expanding said second surface of revolution into abutment with said bore.

13. A toolholder component assembly, the combination comprising:

a toolholder;

a tool support member;

means for releasably mounting said toolholder on said tool support member;

said toolholder having a forward end for receiving a tool, a shank extending rearwardly therefrom about a longitudinal axis, and a rearwardly facing abutment face;

said shank having a first surface of revolution about said longitudinal axis facing radially outwardly and tapering radially inwardly while extending rearwardly;

said shank having a second surface of revolution about said longitudinal axis rearwardly of said first surface of revolution and facing radially outwardly;

said tool support member having a forwardly facing surface thereon and a bore extending rearwardly therein;

said bore having a forward surface of revolution about said longitudinal axis facing radially inwardly and tapering radially inwardly while extending rearwardly;

said bore having a rear surface of revolution about said longitudinal axis facing radially inwardly;

said rearwardly facing abutment surface abutted against said forwardly facing surface;

said first surface of revolution resiliently held in an interference fit with said forward surface of revolution by said means for releasably mounting;

and said second surface of revolution resiliently expanded against said rear surface of revolution by said means for releasably mounting.

14. The combination according to claim 11 wherein said first surface of revolution radially extends beyond said forward surface of revolution by at least 0.0005 inches when said first surface of revolution and said forward surface of revolution are in an unstressed state.

* * * * *